United States Patent

Dean et al.

Patent Number: 5,533,011
Date of Patent: Jul. 2, 1996

[54] DUAL DISTRIBUTED ANTENNA SYSTEM

[75] Inventors: Richard F. Dean, Boulder, Colo.;
Franklin P. Antonio, Del Mar, Calif.;
Klein S. Gilhousen, Bozeman, Mont.;
Charles E. Wheatley, III, Del Mar, Calif.

[73] Assignee: Qualcomm Incorporated, San Diego, Calif.

[21] Appl. No.: 370,769

[22] Filed: Dec. 23, 1994

Related U.S. Application Data

[63] Continuation of Ser. No. 112,392, Aug. 27, 1993, abandoned, which is a continuation-in-part of Ser. No. 849,651, Mar. 9, 1992, Pat. No. 5,280,472, which is a continuation of Ser. No. 624,118, Dec. 7, 1990, abandoned.

[51] Int. Cl.⁶ .................................................. H04B 7/04
[52] U.S. Cl. .......................... 370/18; 375/267; 455/52.3; 455/276.1
[58] Field of Search .............................. 370/18; 375/200, 375/205, 208, 267, 299, 347, 349; 455/10, 18, 19, 52.1–52.3, 101, 272, 276.1, 278.1

[56] References Cited

U.S. PATENT DOCUMENTS

| | | | |
|---|---|---|---|
| 4,383,327 | 5/1983 | Timor | 370/93 |
| 4,672,605 | 6/1987 | Hustig et al. | 370/76 |
| 4,672,658 | 6/1987 | Kavehrad et al. | 379/63 |
| 4,761,778 | 8/1988 | Hui | 370/60 |
| 4,841,527 | 6/1989 | Roychoudhori | 371/32 |
| 4,850,036 | 7/1989 | Smith | 455/179 |
| 4,866,732 | 9/1989 | Carey et al. | 375/1 |
| 4,866,733 | 9/1989 | Morishita | 375/1 |
| 4,901,307 | 2/1990 | Gilhousen | 320/18 |
| 4,914,676 | 4/1990 | Iwamatsu et al. | 375/102 |
| 4,920,348 | 4/1990 | Baghdady | 342/433 |
| 4,984,247 | 1/1991 | Koufmann | 375/1 |
| 5,018,165 | 5/1991 | Sohner et al. | 375/1 |
| 5,046,066 | 9/1991 | Messenger | 370/94.1 |
| 5,056,109 | 10/1991 | Gilhousen et al. | 375/1 |
| 5,073,900 | 12/1991 | Mallinckrodt | 375/1 |
| 5,101,501 | 3/1992 | Gilhousen et al. | 375/1 X |
| 5,103,459 | 4/1992 | Gilhousen et al. | 375/1 |
| 5,280,472 | 1/1994 | Gilhousen et al. | 370/18 |
| 5,289,499 | 2/1994 | Weecackody | 370/18 X |
| 5,347,535 | 9/1994 | Karasawa et al. | 375/1 |

FOREIGN PATENT DOCUMENTS

| | | | |
|---|---|---|---|
| 2237706 | 5/1993 | United Kingdom | H04B 71/04 |
| 9109295 | 6/1992 | WIPO | H04J 13/00 |

OTHER PUBLICATIONS

IEEE Publication entitled "GSM Base–Station Antenna Diversity Using Soft Decision Combining on Up–link and Delayed–Signal Transmission on Down–link", by Mogensen, May 18, 1993, pp. 611–615.

*Primary Examiner*—Melvin Marcelo
*Attorney, Agent, or Firm*—Russell B. Miller; Katherine W. White

[57] ABSTRACT

A distributed antenna system is utilized in a system for providing multipath signals which facilitate signal diversity for enhanced system performance. Each node of the antenna comprises more than one antenna. Each antenna at a common node provides a path having a different delay to the base station.

16 Claims, 11 Drawing Sheets

1

DUAL DISTRIBUTED ANTENNA SYSTEM

This is a continuation of application Ser. No. 08/112,392, filed Aug. 27, 1993, now abandoned which is a continuation in part of application Ser. No. 07/849,651, filed Mar. 9, 1992, now U.S. Pat. No. 5,280,472, which is a continuation of application Ser. No. 07/624,118 filed Dec. 7, 1990, now abandoned.

BACKGROUND OF THE INVENTION

I. Field of the Invention

The present application is related to U.S. Pat. No. 5,280,472 issued Jan. 18, 1994, entitled "CDMA MICROCELLULAR TELEPHONE SYSTEM AND DISTRIBUTED ANTENNA SYSTEM THEREFOR" which is a continuation of U.S. patent application Ser. No. 07/624,118, filed Dec. 7, 1990, of the same title now abandoned, and as such also relates telephone systems. The present invention relates to communication systems, particularly indoor communication systems including cellular telephones, personal communication services (PCS), wireless private branch exchange (PBX) and wireless local loop telephone systems. More specifically, the present invention relates to a novel and improved distributed antenna system for microcellular communication systems to facilitate indoor communications using spread spectrum signals.

II. Description of the Related Art

The use of code division multiple access (CDMA) modulation techniques is one of several techniques for facilitating communications in which a large number of system users are present. Other multiple access communication system techniques, such as frequency hopping spread spectrum, time division multiple access (TDMA), frequency division multiple access (FDMA) and amplitude modulation schemes such as amplitude companded single sideband (ACSSB) are known in the art. However the spread spectrum modulation technique of CDMA has significant advantages over these modulation techniques for multiple access communication systems. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention, of which the disclosure thereof is incorporated by reference.

In the just mentioned patent, a multiple access technique is disclosed where a large number of mobile telephone system users each having a transceiver communicate through satellite repeaters or terrestrial base stations (also referred to as cell-sites stations, cell-sites, or for short, cells) using code division multiple access (CDMA) spread spectrum communication signals. In using CDMA communications, the frequency spectrum can be reused multiple times thus permitting an increase in system user capacity. The use of CDMA results in a much higher spectral efficiency than can be achieved using other multiple access techniques.

The terrestrial channel experiences signal fading that is characterized by Rayleigh fading. The Rayleigh fading characteristic in the terrestrial channel signal is caused by the signal being reflected from many different features of the physical environment. As a result, a signal arrives at a mobile unit receiver from many directions with different transmission delays. At the UHF frequency bands usually employed for mobile radio communications, including those of cellular mobile telephone systems, significant phase differences in signals traveling on different paths may occur. The possibility for destructive summation of the signals may result, with on occasion deep fades occurring.

Terrestrial channel fading is a very strong function of the physical position of the mobile unit. A small change in position of the mobile unit changes the physical delays of all the signal propagation paths, which further results in a different phase for each path. Thus, the motion of the mobile unit through the environment can result in a quite rapid fading process. For example, in the 850 MHz cellular radio frequency band, this fading can typically be as fast as one fade per second per mile per hour of vehicle speed. Fading this severe can be extremely disruptive to signals in the terrestrial channel resulting in poor communication quality. Additional transmitter power can be used to overcome the problem of fading. However, such power increases effect both the user by excessive power consumption, and the system by increased interference.

The direct sequence spread spectrum CDMA modulation techniques disclosed in U.S. Pat. No. 4,901,307 offer many advantages over narrow band modulation techniques used in communication systems employing satellite or terrestrial repeaters. The terrestrial channel poses special problems to any communication system particularly with respect to multipath signals. The use of CDMA techniques permit the special problems of the terrestrial channel to be overcome by mitigating the adverse effect of multipath, e.g. fading, while also exploiting the advantages thereof.

In a CDMA communication system, the same wideband frequency channel can be used for communication by all base stations. Typically a FDMA scheme is used where one frequency band is used for communications from the base stations to the remote or mobile stations (forward link) and another for communications from the remote or mobile stations to the base stations (reverse link). The CDMA waveform properties that provide processing gain are also used to discriminate between signals that occupy the same frequency band. Furthermore the high speed pseudonoise (PN) modulation allows many different propagation paths to be separated, provided the difference in path delays exceed the PN chip duration, i.e. 1/bandwidth. If a PN chip rate of approximately 1 MHz is employed in a CDMA system, the full spread spectrum processing gain, equal to the ratio of the spread bandwidth to system data rate, can be employed to discriminate against paths that differ by more than one microsecond in path delay from each other. A one microsecond path delay differential corresponds to differential path distance of approximately 1,000 feet. The urban environment typically provides differential path delays in excess of one microsecond, and up to 10–20 microseconds are reported in some areas.

In narrow band modulation systems such as the analog FM modulation employed by conventional telephone systems, the existence of multiple paths results in severe multipath fading. With wideband CDMA modulation, however, the different paths may be discriminated against in the demodulation process. This discrimination greatly reduces the severity of multipath fading. Multipath fading is not totally eliminated in using CDMA discrimination techniques because there occasionally exists paths with delayed differentials of less than the PN chip duration for the particular system. Signals having path delays on this order cannot be discriminated against in the demodulator, resulting in some degree of fading.

It is therefore desirable in such communication systems that some form of diversity be provided which would permit a system to reduce fading. Diversity is one approach for mitigating the deleterious effects of fading. Three major types of diversity exist: time diversity, frequency diversity, and space diversity.

Time diversity can best be obtained by the use of repetition, time interleaving, and error detection and correction coding which is a form of repetition. The present invention employs each of these techniques as a form of time diversity.

CDMA by its inherent nature of being a wideband signal offers a form of frequency diversity by spreading the signal energy over a wide bandwidth. Therefore, frequency selective fading affects only a small part of the CDMA signal bandwidth.

Space or path diversity is obtained by providing multiple signal paths through simultaneous links from a mobile user through two or more base stations. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501, issued Mar. 31, 1992, entitled "SOFT HANDOFF IN A CDMA CELLULAR TELEPHONE SYSTEM", and U.S. Pat. No. 5,109,390, issued Apr. 28, 1992, entitled "DIVERSITY RECEIVER IN A CDMA CELLULAR TELEPHONE SYSTEM", both assigned to the assignee of the present invention.

The deleterious effects of fading can be further controlled to a certain extent in a CDMA system by controlling transmitter power. A fade which decreases the power received by the base station from the mobile unit can be compensated for by increasing the power transmitted by the mobile station. The power control function operates in accordance with a time constant. Depending on the time constant of the power control loop and the length of time of a fade, the system may compensate for the fade by increasing the transmit power of the mobile unit. A system for base station and mobile unit power control is disclosed in U.S. Pat. No. 5,056,109, issued Oct. 8, 1991, entitled "METHOD AND APPARATUS FOR CONTROLLING TRANSMISSION POWER IN A CDMA CELLULAR MOBILE TELEPHONE SYSTEM", also assigned to the assignee of the present invention.

The existence of multipath can provide path diversity to a wideband PN CDMA system. If two or more paths are available with differential path delay greater than one chip duration two or more PN receivers can be employed to separately receive these signals at a single base station or mobile unit. Since these signals typically exhibit independence in multipath fading, i.e., they usually do not fade together, the outputs of the two receivers can be diversity combined. Therefore a loss in performance only occurs when both receivers experience fades at the same time. Hence, one aspect of the present invention is the provision of two or more PN receivers in combination with a diversity combiner. In order to exploit the existence of multipath signals, to overcome fading, it is necessary to utilize a waveform that permits path diversity combining operations to be performed.

A method and system for constructing PN sequences that provide orthogonality between the users so that mutual interference is reduced is disclosed in U.S. Pat. No. 5,103,459, issued Apr. 7, 1992, entitled "SYSTEM AND METHOD FOR GENERATING SIGNAL WAVEFORMS IN A CDMA CELLULAR MOBILE TELEPHONE SYSTEM", also assigned to the assignee of the present invention. Using these techniques to reduce mutual interference allows higher system user capacity and better link performance. With orthogonal PN codes, the cross-correlation is zero over a predetermined time interval, resulting in no interference between the orthogonal codes, provided only that the code time frames are time aligned with each other.

The above mentioned patents and patent applications disclose a novel multiple access technique wherein a large number of mobile unit telephone system users communicate through satellite repeaters or terrestrial base stations using code division multiple access spread spectrum modulation that allows the spectrum to be used multiple times. The resulting system design has a much higher spectral efficiency than can be achieved using previous multiple access techniques.

In cellular telephone systems, a large geographic area is provided with mobile telephone service by installing a number of base stations, each positioned to cover a cell, and the set of cells situated so as to provide coverage of the entire geographic area. If service demand exceeds the capacity that can be provided by a set of base stations providing coverage over a certain area, the cells are subdivided into smaller cells and more base stations are added. This process has been carried out to the extent that some major metropolitan areas have nearly 400 base stations.

In a further development of the cellular telephone idea, it is desired to provide a number of very small cells, called microcells, which would provide coverage of a very limited geographic area. Usually, it is considered that such areas are limited to a single floor of an office building and the mobile telephone service can be viewed as a cordless telephone system that may or may not be compatible with the mobile cellular telephone system. The rationale for providing such a service is similar to the reasoning for use of Private Branch Exchange (PBX) systems in business offices. Such systems provide for low cost phone service for a large number of calls between phones within the business while providing simplified dialing for internal phone numbers. A few lines are also provided to connect the PBX system to the public telephone system, allowing calls to be made and received between telephones in the PBX system and telephones located elsewhere. It is desirable for the microcell system to provide a similar level of service but with the added feature of cordless operation anywhere within the service area of the PBX.

In the indoor communication system environment, path delays are typically much shorter in duration than experienced in the outdoor communication system environment. In buildings and other indoor environments where indoor communication systems are used, it is necessary to provide a form of diversity which enables discrimination between multipath signals.

The primary problem solved by the disclosed invention is the provision of a simple antenna system that provides high capacity, simple installation, good coverage and excellent performance. Another problem solved by the present invention is that it achieves the above coverage while maintaining compatibility with the mobile cellular system and while taking a negligible amount of capacity away from the mobile system. This is achieved in the disclosed invention by combining the capacity properties of CDMA with a new distributed antenna design that confines the radiation to a very limited and carefully controlled area.

The implementation of spread spectrum communication techniques, particularly CDMA techniques, in an indoor environment provides features which vastly enhance system reliability and capacity over other communication systems. CDMA techniques as previously mentioned further enable problems such as fading and interference to be readily overcome. Accordingly, CDMA techniques further promote greater frequency reuse, thus enabling a substantial increase in the number of system users.

SUMMARY OF THE INVENTION

A key aspect in implementing an indoor communication system is the usage of the dual set of distributed antennas of the present invention. In this concept, two sets of antennas are fed by a common signal with only time delay processing to distinguish signals. The transmit output of the base station is fed to a string of antenna elements, for example with a coaxial cable. The antenna elements connect to the cable using power splitters. The resulting signals, amplified and frequency converted as necessary, are fed to the antennas. The salient features of this distributed antenna concept are as follows: (1) simple and inexpensive dual antenna node design; (2) neighboring antennas have time delays inserted in feed structure so signals received and transmitted from neighboring antennas are distinguishable by PN temporal processing; (3) exploitation of direct sequence CDMA's ability to discriminate against multipath; and (4) creation of deliberate multipath that satisfies discrimination criteria.

In the present invention, two sets of antenna cables are positioned in parallel thus creating a series of nodes comprised of two antenna elements. Signals transmitted from antennas of different antenna elements at a common node are provided different delay paths between the base station and the antenna. The antenna elements may comprise down conversion circuitry thus reducing the cabling path loss between the antenna elements and the base station and allowing the use of readily available SAW devices as delay elements.

Another advantage is that little site specific engineering is required for installation. Normally, antenna placement is determined only by physical constraints, together with the requirement that every location desiring service must be covered by a set of two antennas. There is no concern for the overlapping of antenna patterns. In fact, overlapping coverage is desirable in that it provides diversity operation to all terminals in the overlap area. Overlap is, however, not required.

The advantages of the distributed antenna concept are clear when considering the inherent simplicity of the base station equipment required to support indoor communications of the type such as cellular telephone, PCS, wireless PBX, wireless local loop or wireless home extension telephone.

BRIEF DESCRIPTION OF THE DRAWINGS

The features, objects, and advantages of the present invention will become more apparent from the detailed description set forth below when taken in conjunction with the drawings.

DETAILED DESCRIPTION OF THE PREFERRED EMBODIMENTS

Figure 1:
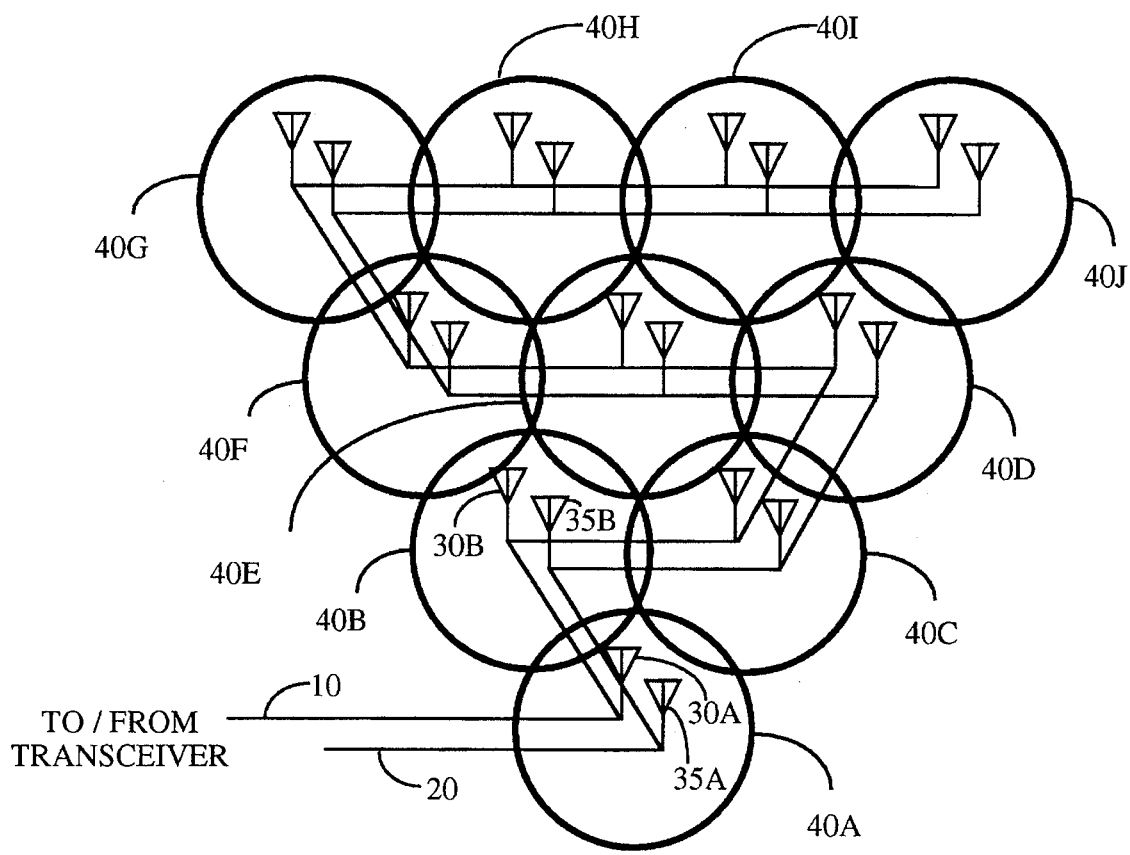
FIG. 1 is an illustration of an exemplary antenna pattern for a distributed antenna system of the present invention.

A single set of antennas and delay elements provides the most basic implementation of the distributed antenna function. Details of the single set of antennas are disclosed in U.S. Pat. No. 5,280,472 issued Jan. 18, 1994, as mentioned above. However a system employing a single set of antennas can experience service quality reductions that can be alleviated by a dual set of antennas. A CDMA system, to achieve high capacity, uses a strict power control mechanism. Each mobile unit transmits enough power to communicate with the antenna with the lowest path loss to the mobile unit. Communications with all other antennas thus have less than optimal energy.

The effects of multipath fading may cause a momentary degradation of service if a mobile unit is positioned in close proximity to a first antenna and positioned at some great distance from other antennas. Under this condition the mobile unit transmits enough power to communicate with the first antenna but not enough power to communicate reliably with the distant antennas. If under this condition the mobile unit were to abruptly experience a severe multipath fade with respect to the first antenna, the reduced signal level at the first antenna and the low signal level at the distant antennas may cause a degradation in service. Communication between the base station and the mobile unit would be sub-optimal until the power control loop increased the transmit power from the mobile unit or until the mobile unit moved to alleviate the multipath fading.

The sub-optimal performance created as described above can be mitigated by placing two antennas at each node. Thus, as opposed to evenly distributing single antennas, the mobile unit in general has similar distance, and hence path loss, between pairs of collocated antennas. If the mobile unit is positioned in close proximity to a pair of collocated antennas and positioned at some great distance from other antennas and the mobile unit abruptly experiences a severe multipath fade with respect to one of the collocated antennas, the second collocated antenna should have sufficient signal level to maintain communication with the mobile unit without degradation.

To obtain maximum benefit from the present invention, the collocated antennas should exhibit an independence in fading meaning that the probability that a severe fade would occur for both antennas at the same mobile unit location is small. To achieve independent fading, a degree of diversity between the collocated antennas is required.

One way to achieve diversity in collocated antennas is to place the antennas some distance apart. The distance should allow the two antennas to have substantially the same coverage area while being spaced apart enough to provide independent fading. Placing two antennas at one base station to obtain diversity is common practice in macrocellular systems. In a macrocellular system, two antennas having relatively large coverage areas, generally on the order of several miles, are placed at one base station. Typically the antennas are placed about 10 to 20 wavelengths (about 6 to 12 feet at the most common frequency used for cellular communications) apart to obtain path diversity and thus independence in fading.

A second method to achieve diversity in collocated antennas is to provide each antenna of a set of collocated antennas with a different polarization, such as vertical and horizontal polarization. A standard indoor environment is bounded in three dimensions. A mobile unit within the three dimensional structure has a variety of signal paths to/from a fixed antenna involving multiple reflections from the surfaces of the structure. Depending on the angles involved, each reflection of a signal may rotate the polarization of the reflected signal. Therefore two signals having different polarization reflecting from the same set of surfaces form two signal paths having different phase characteristics. Because the signals have different phase characteristics, they also have different fading characteristics. Due to this process, two collocated antennas where the antennas have two different polarizations possess a high degree of independence in fading even if the antennas are placed very close to one another.

FIG. 1 provides an illustration of an exemplary antenna pattern for a dual set of antennas configured in accordance with the present invention. The antenna pattern, as illustrated in FIG. 1, is generated by two series of omnidirectional antennas. Each set of antennas (30A–J and 35A–J) defines an antenna pattern 40A–40J that is preferably overlapping with the pattern of neighboring antennas. For example, antennas 30A and 35A define the antenna pattern 40A. Neighboring antennas refer to antennas having overlapping or contiguous antenna patterns which are not collocated antennas at a common node. The overlapping of patterns provides continuous antenna coverage for the desired area. The two sets of antennas are coupled in series in an exemplary manner. The first set of antennas is coupled as indicated by line 10. The second set of antennas is coupled as indicated by line 20. The second set of antennas is approximately in parallel with the first set of antennas such that each antenna of the first set is collocated with an antenna of the second set.

As mentioned previously, control of signal power is an important aspect of a CDMA telephone system in order to realize high user capacity. A conventional omnidirectional antenna radiates a signal roughly equal in all directions. The signal strength is reduced with radial distance from the antenna according to the propagation characteristics of the physical environment. The propagation characteristics may vary from inverse second power to inverse 5.5 power law of the radial distance between the mobile unit and the fixed antennas.

A base station that is designed to serve a certain radius must transmit at a sufficient power level so that a mobile unit at the edge of the cell covered by the base station receives an adequate signal power level. Mobile units that are closer than the edge of the cell receive a greater than adequate signal level. Directional antenna beams can be formed using a variety of techniques known in the art. However, the forming of directional beams cannot alter the propagation law. Coverage of a desired area by a signal can be obtained by a combination of antenna pattern, antenna placement, and transmitter power.

The use of a distributed antenna system provides the desired antenna pattern, such as coverage of a hallway of a building, where each antenna element provides limited coverage. In providing limited antenna coverage the power necessary to reach a mobile unit within the smaller coverage area is correspondingly reduced since propagation loss is reduced.

However, there is a problem with multiple antennas all radiating the same signal. There may be areas, particularly near points equidistant from two or more of the antennas where signals may be received from the two antennas that cancel each other. Points where the signal may cancel are separated by approximately one-half wavelength. At 850 MHz this is equal to 17.6 cm or about 7 inches. If two signals arrive at the receive antenna at equal strength but opposite in phase, then they may so cancel. Essentially, this is man-made multipath fading. As with natural multipath fading, diversity is the best method for mitigation of fading. The CDMA system design provides several methods of diversity for mitigation of multipath fading.

The above mentioned patents and copending patent applications disclose a cellular telephone system that uses a CDMA modulation with a 1.25 MHz bandwidth, multiple forms of diversity, and very careful transmitter power control. One method of exploiting diversity is the provision of a "rake" receiver architecture in which multiple receivers are provided, each capable of receiving a signal that has traveled a different path and therefore exhibits a different delay. Included is a separate searcher receiver which continuously scans the time domain looking for the best paths and assigning the multiple data receivers accordingly.

Another method of diversity is path diversity. In path diversity, the signal is radiated from multiple antennas, providing more than one propagation path. If two or more antennas can provide acceptable communication paths to the mobile unit receiver then fading mitigation through path diversity can be obtained.

In the microcell system it is desired to provide multiple antennas in order to provide coverage in a desired coverage area but the capacity demand for the system does not require that each antenna be supplied with a separate set of signals as in the conventional cellular system. Instead, to minimize the cost and complexity of the system, it is desired to feed some or all of the antennas in the microcell system with the same RF signals. In areas of the microcell system where good paths are possible to two or more of the antennas then path diversity can be obtained.

What is desired is a simple, low cost way to distinguish the signals feeding the different antennas without adding significantly to the complexity of the system. The method for so doing in the present invention is the addition of delay elements in the feeder lines between the base station transceiver and the antennas elements within an array of antennas.

Figure 2:
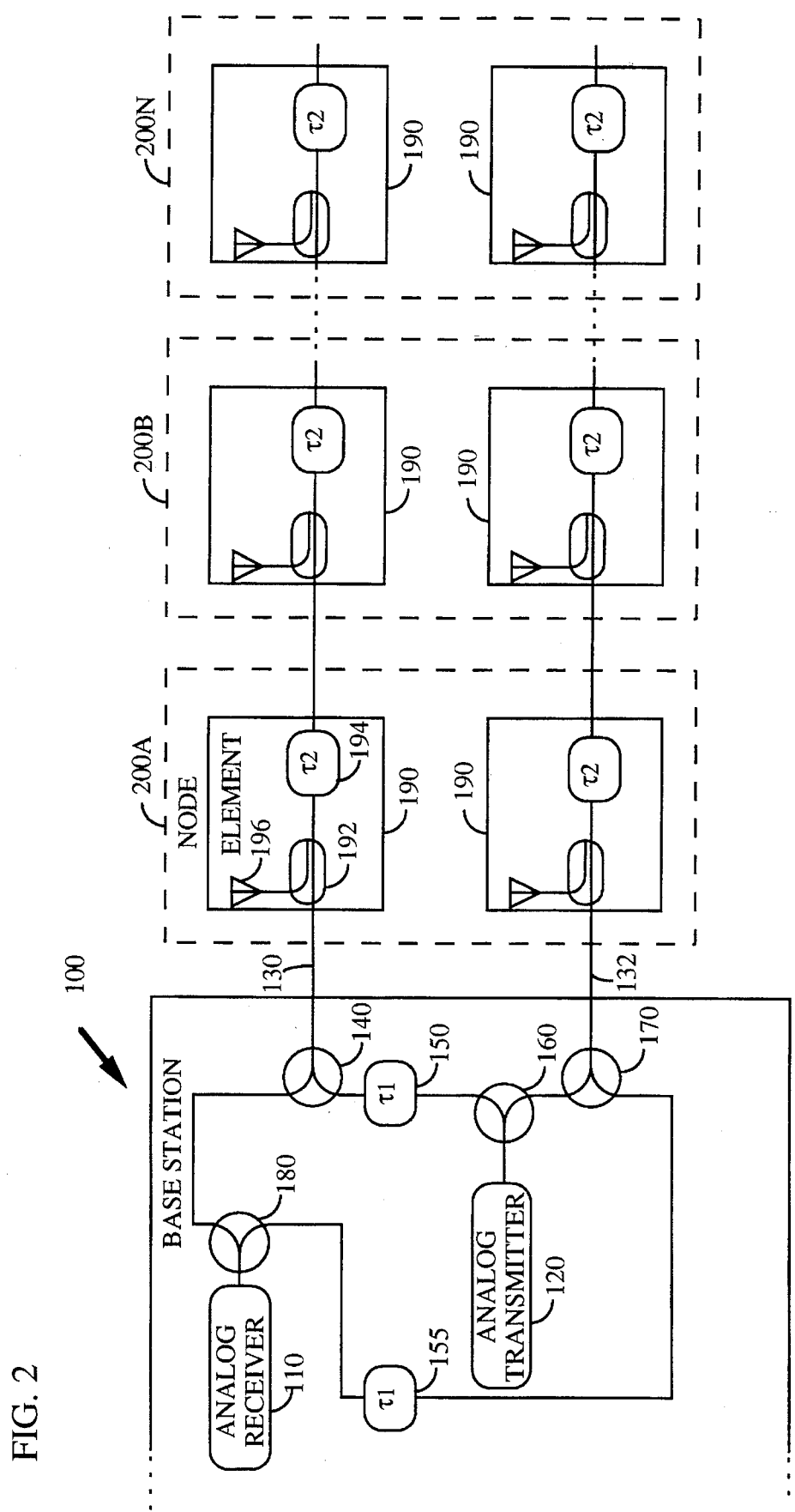
FIG. 2 is a block diagram of a basic exemplary dual element distributed antenna system and base station interface.

FIG. 2 illustrates an embodiment using a dual set of antennas with delay elements. Base station 100 provides signals to and accepts signals from the antenna array comprising node 200A–200N. Analog transmitter 120 produces the RF signal for transmission by the distributed antenna array. The signal is split to form two signals to be transmitted by the parallel paths by splitter 160. The first transmit path is delayed by delay element 150 and then coupled to the first receive path by combiner 140 that may be replaced with a duplexer. The second transmit path is directly coupled to the second receive path by combiner 170 that may also be replaced with a duplexer. Combiner 180 sums the two receive paths, one of which has been delayed by delay element 155, and analog receiver 110 accepts the combined incoming RF signal for processing.

The combined receive and transmit signals are cabled via distribution cables 130 and 132 to first node 200A comprising two distribution elements 190. Each element 190 comprises coupler 192 for coupling a portion of the signal between antenna 196 and a respective distribution cable 130 or 132. Each element 190 also comprises delay element 194 for delaying signals and providing diversity from other antenna elements on distribution cable 130 or 132. Delay element 150 provides the diversity of signals of collocated antennas at a common node. Delay element 194 provides time diversity of signals from neighboring antennas. To retain complete time diversity of each neighboring antenna, the delay time of delay element 194 should be different than the delay time of delay element 150. An exemplary relationship in the delay period of delay elements 150 and 194 is such that the delay between the base station and every antenna in the system is different by at least one chip duration. The difference in delay can be achieved by selecting the delay time of element 150 to be greater than the sum of the delays in a single path (e.g. the delay of element 150 is N times the delay of element 194). It can also be achieved by selecting the delay time of element 150 to be an appropriate submultiple of the delay of element 194 (e.g. the delay of element 150 is equal to one chip duration and the delay of element 194 is two chip durations). A second node 200B, containing like elements, is cascaded in series with first node 200A. The set of antennas continues in this manner for the length of the dual sets.

Figure 3:
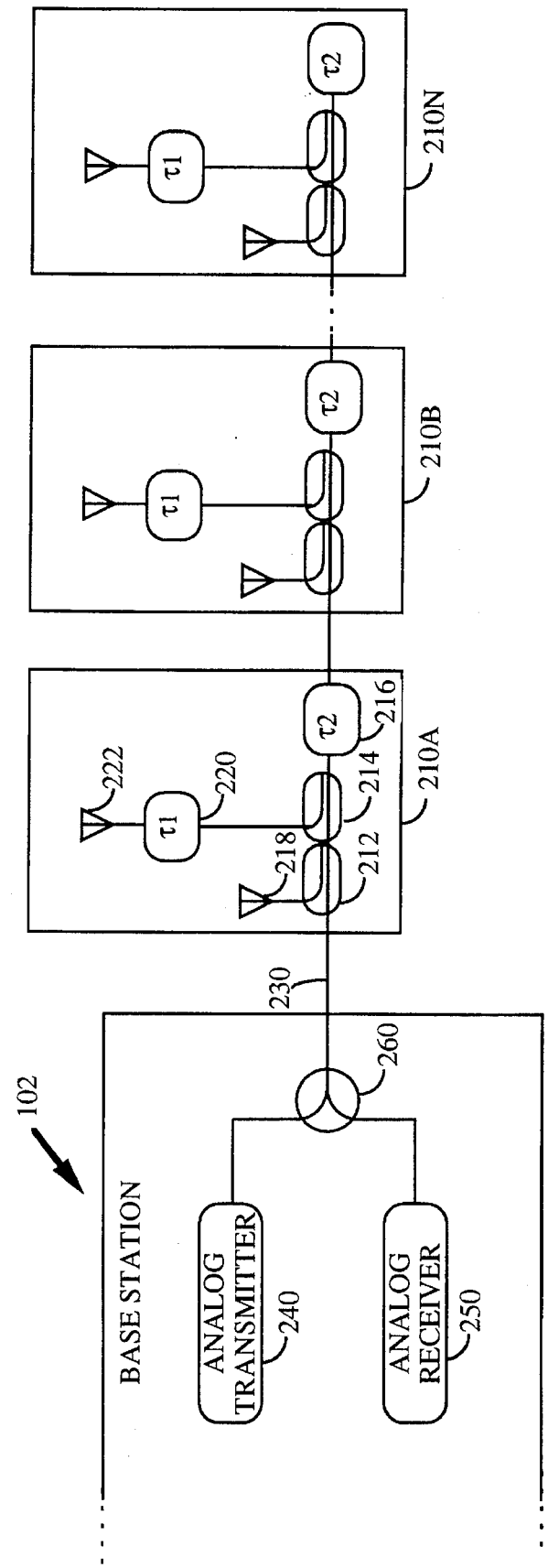
FIG. 3 is a block diagram of a basic exemplary E-structure element distributed antenna system alternative to FIG. 2.

An alternative embodiment of FIG. 2 is illustrated in FIG. 3. FIG. 3 has an E-structure while performing the same function as the parallel structure of FIG. 2. Within base station 102, analog transmitter 240 and analog receiver 250 are coupled by combiner 260 to distribution cable 230. Each node in the E-structure comprises a first coupler 212 that couples signals between distribution cable 230 and antenna 218. A second coupler 214 couples signals between distribution cable 230 and second antenna 222 via delay element 220. Delay element 220 is used to provide time diversity at node 210A between antennas 218 and 222. A second delay element 216 is positioned in series with cable 230 and provides diversity between nodes, e.g. between nodes 201A and 210B. Components 212–222 can be rearranged within each node in a variety of fashions to perform the same basic function.

If the multiple antenna systems described above are provided with delay lines in the feeders such that the signal from each antenna is at least one chip duration delayed from its neighbors, then the multiple receiver architecture of the mobile units allows the signal from each antenna to be received separately and to be coherently combined in such a way that cancellation does not occur. In fact, fading due to other reflections in the environment can be greatly mitigated by the disclosed technique because a form of path diversity is provided.

The mobile units contain one or more data receivers and a searcher receiver. The searcher receiver scans the time domain determining what paths exist and which are the strongest paths. The available data receivers are then assigned to demodulate the signals traveling the strongest available paths. The base station receivers contain a similar capability.

Figure 4:
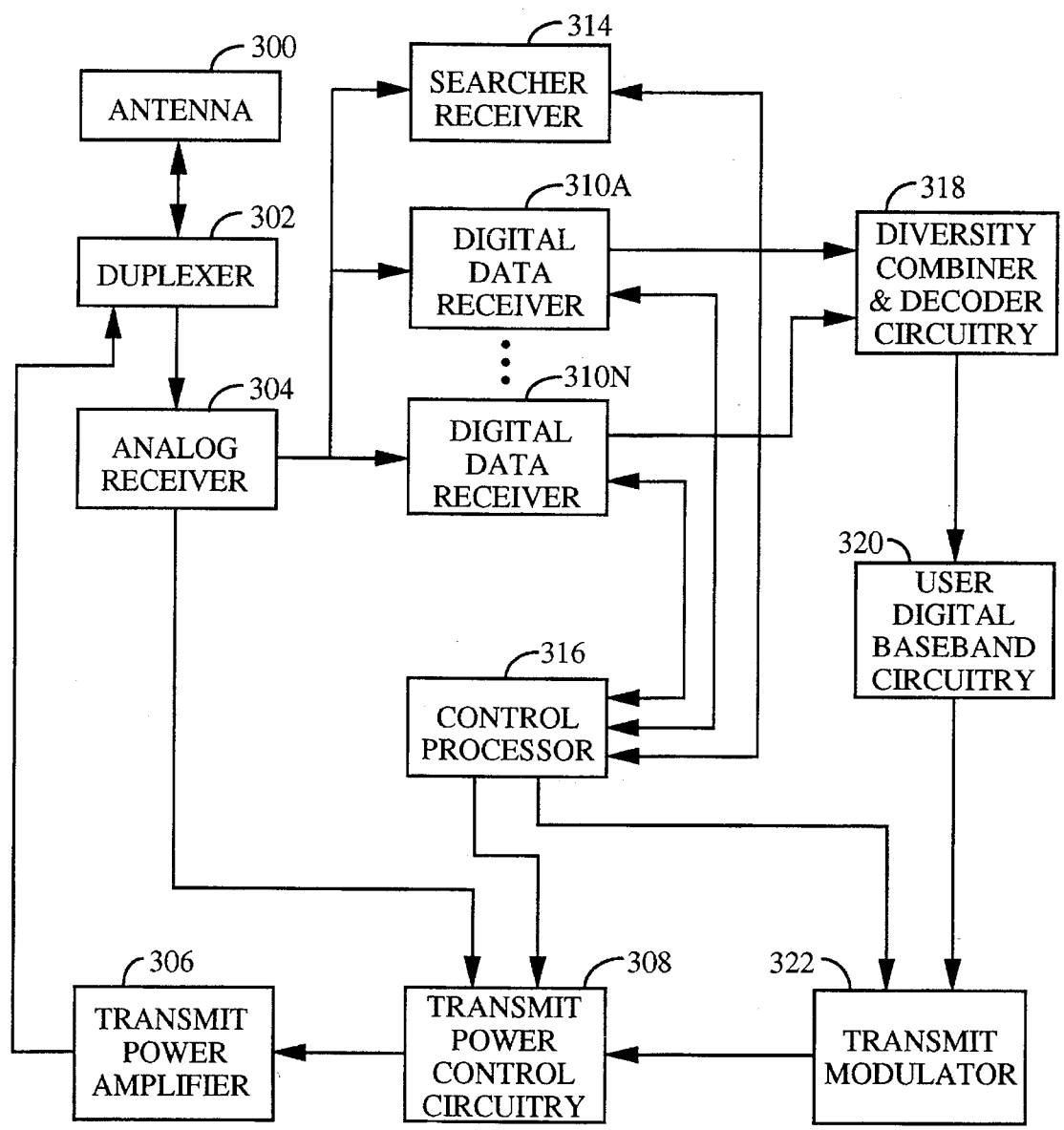
FIG. 4 is a block diagram of an exemplary implementation of a remote or mobile unit transceiver.

FIG. 4 illustrates in block diagram form an exemplary mobile unit CDMA telephone set. The mobile unit includes an antenna 300 which is coupled through duplexer 302 to analog receiver 304 and transmit power amplifier 306.

Receiver 304 receives the RF frequency signals from duplexer 302 for amplification and frequency downconversion. The signals are also filtered and digitized for providing to digital data receivers 310A–310N and searcher receiver 314. Further details of an exemplary embodiment of receivers 304, 310A–310N and 314 are illustrated in the above-mentioned U.S. Pat. Nos. 5,103,459 and 5,109,390.

Receiver 304 also performs a power control function for adjusting the transmit power of the mobile unit. Receiver 304 generates an analog power control signal that is provided to transmit power control circuitry 308.

The digitized signal at the output of analog receiver 304 may contain the signals of many on-going calls together with the pilot carriers transmitted by the current base station and all neighboring base station. The function of the receivers 310A–310N are to correlate the samples with the proper PN sequence. This correlation process provides a property that is well-known in the art as "processing gain" which enhances the signal-to-interference ratio of a signal matching the proper PN sequence while not enhancing other signals. Correlation output is then synchronously detected using the pilot carrier from the closest base station as a carrier phase reference. The result of this detection process is a sequence of encoded data symbols.

A property of the PN sequence as used in the present invention is that discrimination is provided against multipath signals. When the signal arrives at the mobile receiver after passing through more than one path, or in the present invention through more than one antenna, there is a difference in the reception time of the signal. If this time difference exceeds one chip duration, then the correlation process discriminates between the signals. The data receiver can track and demodulate either of the earlier or later arriving signal. If two or more data receivers, typically three, are provided then multiple independent paths can be tracked and processed in parallel.

Searcher receiver 314, under control of control processor 316 is continuously scanning the time domain around the nominal time of a received pilot signal of the base station for other multipath pilot signals. Receiver 314 measures the strength of any reception of a desired waveform at times other than the nominal time. Receiver 314 compares signal strength in the received signals. Receiver 314 provides a signal strength signal to control processor 316 indicative of the strongest signals. Processor 316 provides control signals to data receivers 310A–310N for each to process a different one of the strongest signals.

The outputs of receivers 310A–310N are provided to diversity combiner and decoder circuitry 318. The diversity combiner circuitry contained within circuitry 318 adjusts the timing of the two streams of received symbols into alignment and adds them together. This addition process may be proceeded by multiplying the two streams by a number corresponding to the relative signal strengths of the two streams. This operation can be considered a maximal ratio diversity combiner. The resulting combined signal stream is then decoded using a forward error correction (FEC)

decoder also contained within circuitry 318. The usual digital baseband equipment is a digital vocoder system. The CDMA system is designed to accommodate a variety of different vocoder designs.

Baseband circuitry 320 typically includes a digital vocoder (not shown) which may be a variable rate type. Baseband circuitry 320 further serves as an interface with a handset or any other type of peripheral device. Baseband circuitry 320 provides output information signals to the user in accordance with the information provided thereto from circuitry 318.

In the mobile unit-to-base station link (reverse link), user analog voice signals are typically provided through a handset as an input to baseband circuitry 320. Baseband circuitry 320 includes an analog to digital (A/D) converter (not shown) which converts the analog signal to digital form. The digital signal is provided to the digital vocoder where it is encoded. The vocoder output is provided to a forward error correction (FEC) encoding circuit (not shown). In the exemplary embodiment the error correction encoding implemented is of a convolutional encoding scheme. The digitized encoded signal is output from baseband circuitry 320 to transmit modulator 322.

Transmit modulator 322 encodes the transmit data, which in the exemplary embodiment is a 64-ary orthogonal signaling technique based upon Walsh codes, and then modulates the encoded signal on a PN carrier signal whose PN sequence is common amongst all mobile units, but is of a different code phase offset assigned to the mobile station for the call. In the alternative the PN sequence may be chosen according to the assigned address function for the call The PN sequence is determined by control processor 316 from call setup information that is transmitted by the base station and decoded by receivers 310A–310N and control processor 316. Control processor 316 provides the PN sequence information to transmit modulator 322 and to receivers 310A–310N for call decoding. As a further detail an outer PN code may be used upon the PN spread signal. Further details on data modulation are disclosed in U.S. Pat. No. 5,103,459.

Transmit modulator 322 further converts the modulated signal to analog form for modulating upon an IF carrier. The IF signal output from transmit modulator 322 is provided to transmit power control circuitry 308. In circuitry 308 transmission signal power is controlled by the analog power control signal provided from receiver 304. Control bits transmitted by the microcell base station in the form of power adjustment commands are processed by data receivers 310A–310N and provided to control processor 316. These power adjustment commands are used by control processor 316 in setting the power level in mobile unit transmission. In response to these commands, control processor 316 generates a digital power control signal that is provided to circuitry 308. Further information on the relationship of receivers 310A–310N and 314, control processor 316 and transmit power control 308 with respect to power control is available in the above-mentioned U.S. Pat. No. 5,056,109.

Transmit power control circuitry 308 outputs the power controlled modulated signal to transmit power amplifier circuitry 306. Circuitry 306 amplifies and converts the IF signal to an RF frequency. Circuitry 306 includes an amplifier which amplifies the power to a final output level. The intended transmission signal is output from circuitry 306 to duplexer 302. Duplexer 302 couples the signal to antenna 300 for transmission to the microcell base station.

Figure 5:
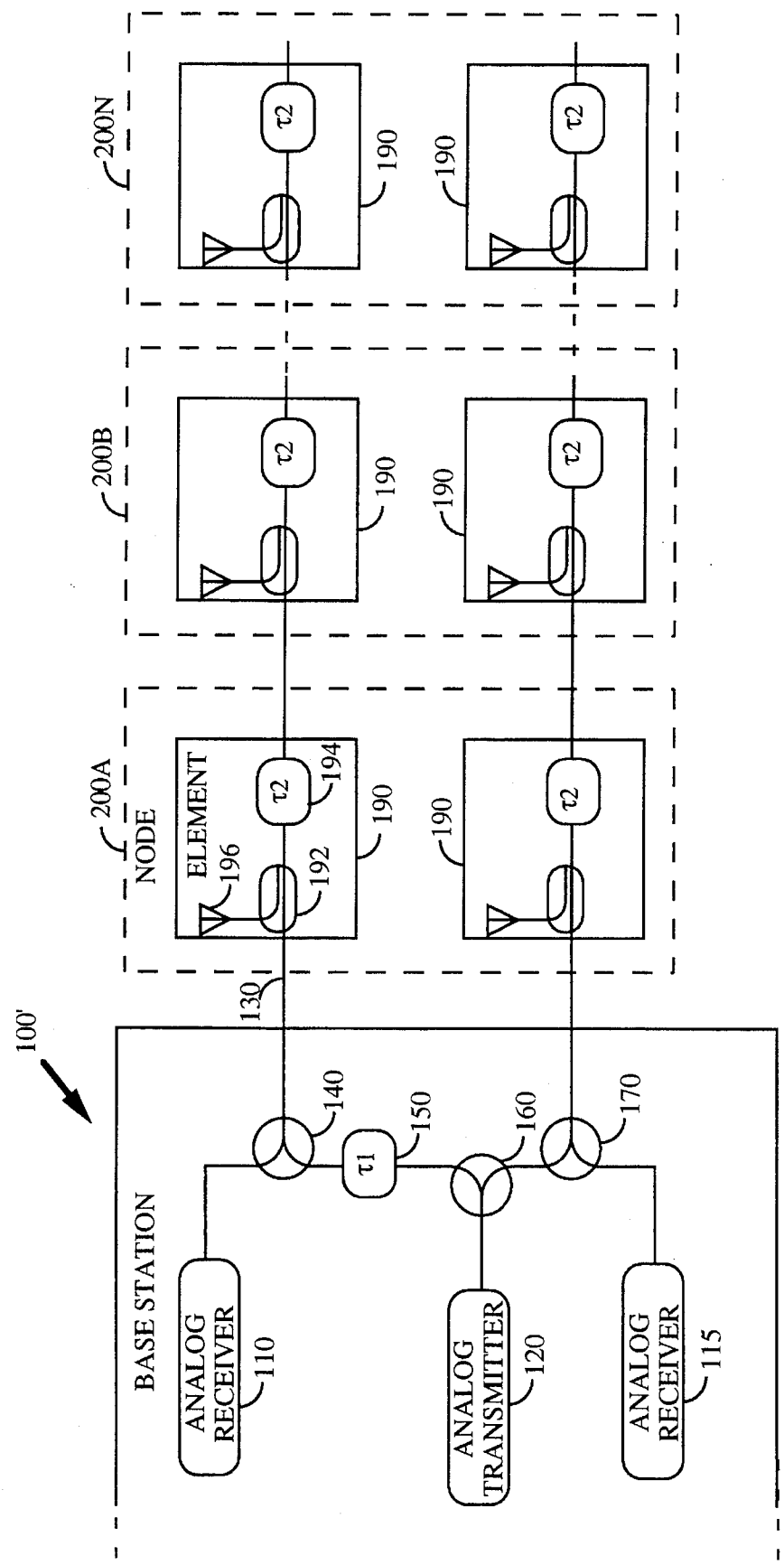
FIG. 5 is a block diagram of a basic exemplary dual element distributed antenna system with an alternative base station interface.

The base station structure is similar to the mobile unit structure of FIG. 4. The preferred embodiment of the base station described below contains elements corresponding to FIG. 5 which illustrates an alternative base station structure embodiment of the structure of FIG. 2. In FIG. 5 the mobile unit signals received by the base station for each of the parallel paths are not combined at RF and instead are separately received and demodulated in the base station and coherently combined as digital bits. Separate demodulation of the two returning paths has several advantages including increased signal to interference ratios due to the coherent combining and less fluctuations in power control both of which lead to high mobile unit-to-base station link capacity.

In FIG. 5, the nodes and elements are identical to corresponding elements in FIG. 2. Base station 100' has a modified RF structure as shown in FIG. 5. Additional analog receiver 115 functions independently of analog receiver 110 with each coupled different demodulators as further illustrated in FIG. 6. Combiner 180 and delay element 155 of FIG. 2 have been eliminated since there is no need for these component in this particular embodiment.

Figure 6:
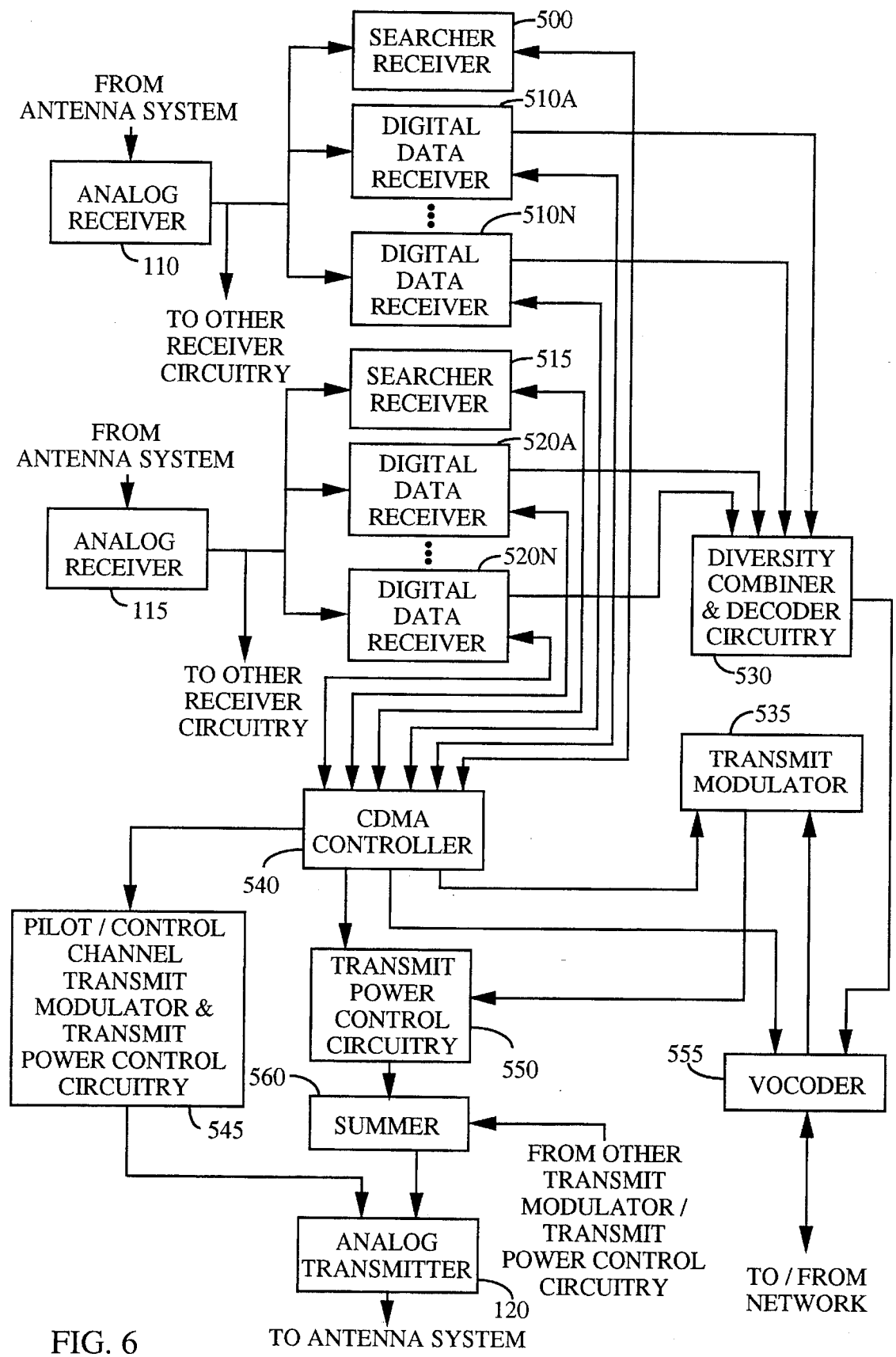
FIG. 6 is a block diagram of an exemplary microcell base station.

FIG. 6 illustrates in block diagram form the exemplary embodiment of a microcell base station. In FIG. 6, the receiver system is comprised of analog receiver 110 and optional analog receiver 115 corresponding to like components of FIGS. 2 and 5. The receiver system is further comprised of independent searcher receiver 500 and digital data receivers 510A–510N associated with analog receiver 110; independent searcher receiver 515 and digital data receivers 520A–520N associated with analog receiver 115; and diversity and combiner & decoder circuitry 530. It should be noted that for the antenna implementation of FIG. 2 the base station need not include searcher receiver 515, digital data receivers 520A–520N, and analog receiver 115 The receiver system may also include associated with each analog receiver 110 and 115 any number of digital data receivers. It should be understood that as few as one digital data receiver (e.g. data receiver 510A) associated with each analog receiver may be employed. However in order to take full advantage of the functionality of a rake receiver it is preferred that two or more data receivers, e.g. typically three or four, be employed for each antenna system. Further details of an exemplary embodiment are provided in U.S. Pat. Nos. 5,103,459 and 5,109,390.

As illustrated in FIG. 5 analog receivers 110 and 115 respectively output a digitized version of composite signal formed from the transmission of one or more mobile units. Searcher receivers 500 and 515 each track the multipath propagations of an individual mobile unit's transmissions. Data receivers 510A–510N and 520A–520N each are assigned to demodulate a particular multipath propagation of the modulated data signal to extract the encoded message data. The composite signal output from analog receivers 110 and 115 is also provided to other sets of searcher receivers and corresponding data receivers (not shown) which are identical in construction to searcher receivers 500 and 515 and data receivers 510A–510N and 520A–520N for tracking and demodulating signals transmitted by other mobile units.

The microcell base station of FIG. 6 includes CDMA controller 540 which is coupled to data receivers 510A–510N and 520A–520N along with searcher receivers 500 and 515. CDMA controller 540 provides Walsh sequence and code assignment, signal processing, timing signal generation, power control and various other related functions.

Signals received on one of the sets of antennas are provided to analog receiver 110 and then to searcher receiver 500. Searcher receiver 500 is used to scan the time domain about the received signal to ensure that digital data receivers 510A–510N are tracking and processing the strongest available time domain signals associated with a particular mobile unit. Searcher receiver 500 provides corresponding signals to CDMA controller 540 which in response thereto generates and provides control signals to digital data receivers 510A–510N for selecting the appropriate received signal for processing.

Signals received on the second of the set of distributed antennas, if used, are provided to analog receiver 115 and then to searcher receivers 520A–520N. Searcher receivers 515 is also used to scan the time domain about the received signal to ensure that digital data receivers 520A–520N are tracking and processing the strongest available time domain signals associated with a particular mobile unit. Searcher receiver 515 provides corresponding signals to CDMA controller 540 which in response thereto generates and provides control signals to digital data receivers 520A–520N for selecting the appropriate received signal for processing. The output signals from receivers 510A–510N and 520A–520N are then processed for optimal performance by diversity combiner & decoder 530.

The signal processing in the base station data receivers and searcher receivers is different in several aspects than the signal processing by similar elements in the mobile unit. In the mobile unit-to-base station link (reverse link) unlike the base station-to-mobile unit link (forward link), the mobile unit does not transmit a pilot signal that can be used for coherent reference purposes in signal processing at the base station. The mobile unit-to-base station link is characterized by a non-coherent modulation and demodulation scheme using 64-ary orthogonal signaling.

Referring again to FIG. 6, searcher receiver 500 and digital data receivers 510A–510N receive the composite signal output from analog receiver 110. In order to decode the spread spectrum signals transmitted to the particular base station receiver through which a single mobile unit communicates, the proper PN sequences must be generated. Further details on the generation of the mobile unit signals are illustrated in U.S. Pat. No. 5,103,459.

Each data receiver tracks the timing of the received signal it is receiving. This is accomplished by the well known technique of correlating the received signal by a slightly early local reference PN and correlating the received signal with a slightly late local reference PN. The difference between these two correlations averages to zero if there is no timing error. Conversely, if there is a timing error, then this difference will indicate the magnitude and sign of the error and the receiver's timing is adjusted accordingly.

Signals from an external or internal network, such as a private branch exchange (PBX), are coupled to the appropriate transmit modulator vocoder 555 under control of CDMA controller 540. Transmit modulator 535 which under control of CDMA controller 540 spread spectrum modulates the data for transmission to the intended recipient mobile unit. Transmit modulator 535 is assigned to encode and modulate data intended for transmission to the particular mobile unit for which search receivers 500 and 515 along with data receivers 510A–510N and 520A–520N are assigned. Transmit modulator 535 modulates the vocoder data with an orthogonal code selected from a set of orthogonal codes with the signal then modulated with a PN spreading code. The PN spread signal is then converted to analog form and provided to transmit power control circuitry 550.

Transmit power control circuitry 550 under the control of CDMA controller 540 controls the transmission power for the signal. The output of circuitry 550 is provided to summer 560 where it is summed with the output of transmit modulator/transmit power control circuits of other channel units. The output of summer 560 is provided to the analog transmit 120. Analog transmitter 120 amplifies the signal for output via the distributed antenna for radiating to the mobile units within the base station service area. Further details on exemplary transmitter circuitry of FIG. 6 are illustrated in U.S. Pat. No. 5,103,459.

FIG. 6 further illustrates pilot/control channel generators and transmit power control circuitry 545. Circuitry 545 under control of CDMA controller 540 generates and controls the power of the pilot signal, the sync channel, and the paging channel for coupling to analog transmitter 120.

It is implicit in the previously described embodiments of the distributed antenna that most RF signal processing, including frequency conversion, amplification, and filtering is performed by the analog receiver and analog transmit circuitry within the base station. There are advantages however to moving these functions to the antenna elements of each node by creating an active antenna element.

Figure 7:
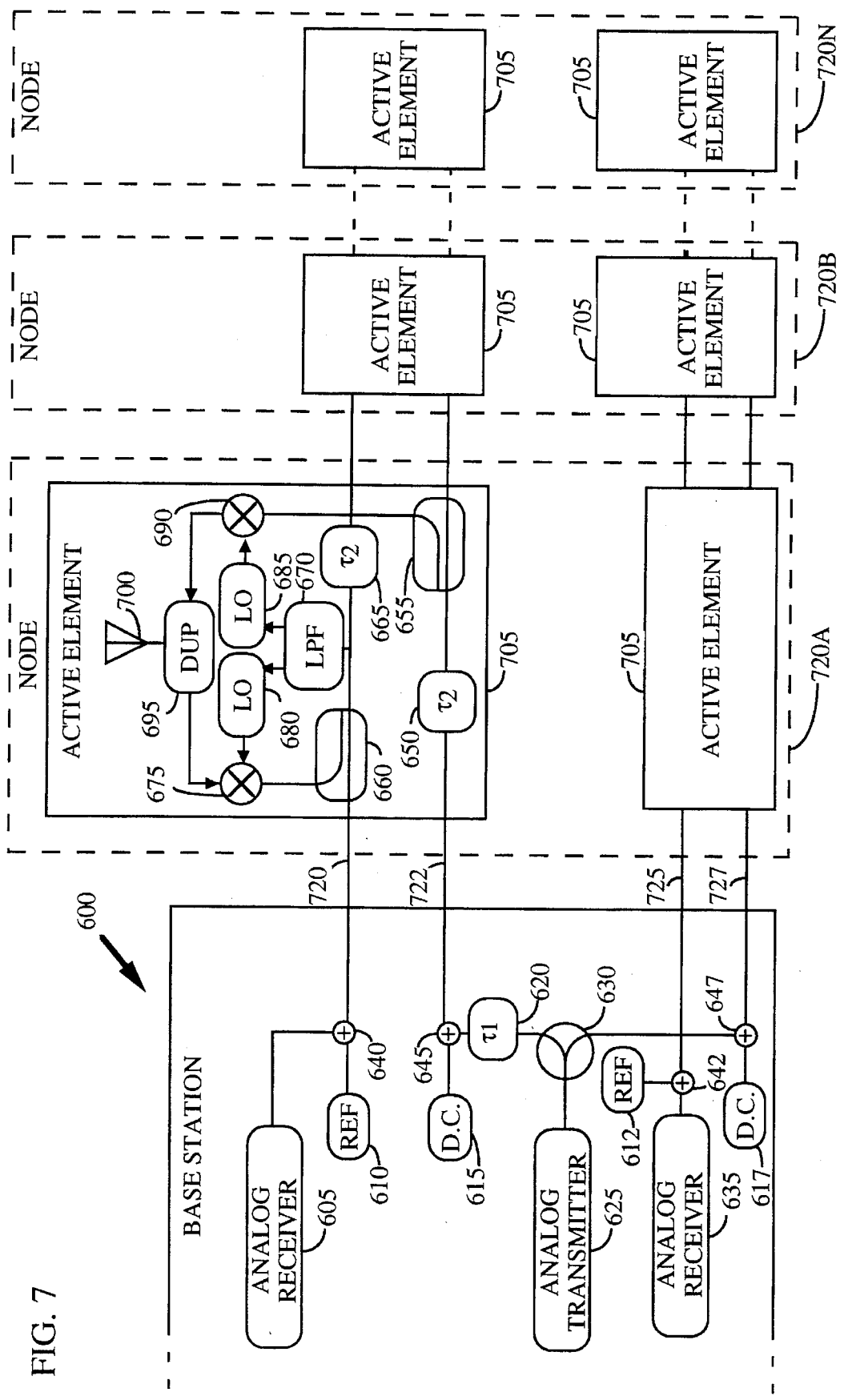
FIG. 7 is a block diagram of a dual element distributed antenna system using an active element structure.

FIG. 7 illustrates an embodiment of the active elements. Base station 600 comprises analog receivers 605 and 635 which receive signals at an intermediate frequency (IF) from the array of distributed antennas or nodes 720A–720N each comprised of a pair of active elements 705. In this particular arrangement analog receiver 605 receives signals along distribution cable 720 from a first set of active elements 705 while analog receiver 635 receives signals along distribution cable 725 from a second set of active elements 705. Analog transmitter 625 produces signals at an IF frequency that is split by splitter 630 into two signals for transmission by the parallel paths. Delay element 620 delays the transmit IF signal provided upon distribution cable 722 which is intended for a first one of the set of active elements 705 contained within nodes 720A–720N. The corresponding non-delayed transmit IF signal from splitter 630 is provided upon distribution cable 722 to the second one of the set of active elements 705 contained within the nodes 720A–720N.

Active elements 705 require both dc power and a frequency reference signal. These signal may be generated for individual active elements or the pair of active elements in the node. A preferred method of supplying these signals is to add them to the IF signals on distribution cables 720, 722, 725 and 727. Reference frequency sources 610 and 612 each produce a reference frequency signal which is used in a phase lock loop within the corresponding element. Preferably the reference frequency signal is within a different frequency band than the receive IF signal to facilitate ease of filtering at the base station and element. In the exemplary embodiment adders 640 and 642 add the reference frequency signals for transmission down cables 720 and 725. Likewise power supplies 615 and 617 supply dc power for the active elements via adders 645 and 647 and cables 722 and 727. It should be understood that the reference frequency signal and dc power may be provided on either the transmit or receive distribution cables, or other various arrangements, in accordance with the connection of elements in elements 705.

Each node of the distributed antenna is comprised of two active elements 705. Since all elements 705 are identical, except for the cables to which they are connected, only the function of a single element 705 connected to a pair distribution cables need be discussed. Element 705 receives the IF transmit signals on cable 722 and couples it through delay element 650 which provides time diversity between neighboring antennas. A portion of the IF transmit signal is coupled from the main path by coupler 655. The coupled signal is upconverted by mixer 690 for transmission at an appropriate RF frequency. The signal is coupled to antenna 700 via duplexer 695.

Antenna 700 also receives the signal transmitted by the mobile unit and couples the signal to the receive portion of the element via duplexer 695. The received signal is down converted to an IF signal by mixer 675 and coupled by coupler 660 to cable 720. The signals coupled by coupler 660 upon cable 720 is combined with the signals received by other node elements which are delayed by delay element 665. An actual implementation of the element may also comprise gain stages in the receive path, for example located between duplexer 695 and mixer 675, for noise figure considerations. Likewise the transmit path might also comprise gain stages to increase the level of the signal at the antenna. Also filter elements may be added to facilitate the signal processing.

Mixers 675 and 690 within element 705 must be driven by local oscillator (LO) 685 at an appropriate frequency. In this embodiment the LOs are created within the element. LO 680 is a phase lock loop (PLL) that provides the driving LO for mixer 675 and LO 685 is a PLL that provides the driving LO for mixer 690. The reference frequency is used to lock the PLL circuits to a common phase and is coupled from the receive path by low pass filter (LPF) 670 that low pass filters the signal on cable 720 to extract the reference frequency signal. Also dc power is coupled (not shown) from cable 722 for all active functions performed within the element. An alternate frequency plan may facilitate the use of a single LO.

The advantages of the active elements are numerous and the cost of the simple hardware is minimal. The active elements may be implemented with readily available mobile unit technology. The IF signal experiences less cable loss per foot of cable than the RF signal does and thus decreases the need for amplification. The delay elements are inexpensive at IF frequencies compared to RF frequencies. At IF the delay elements may be SAW filters that provide delay with little phase error across the signal bandwidth and provide filtering for unwanted signals. SAW filters cascade in series easily while higher frequency elements can require a high isolation to perform correctly.

Figure 8:
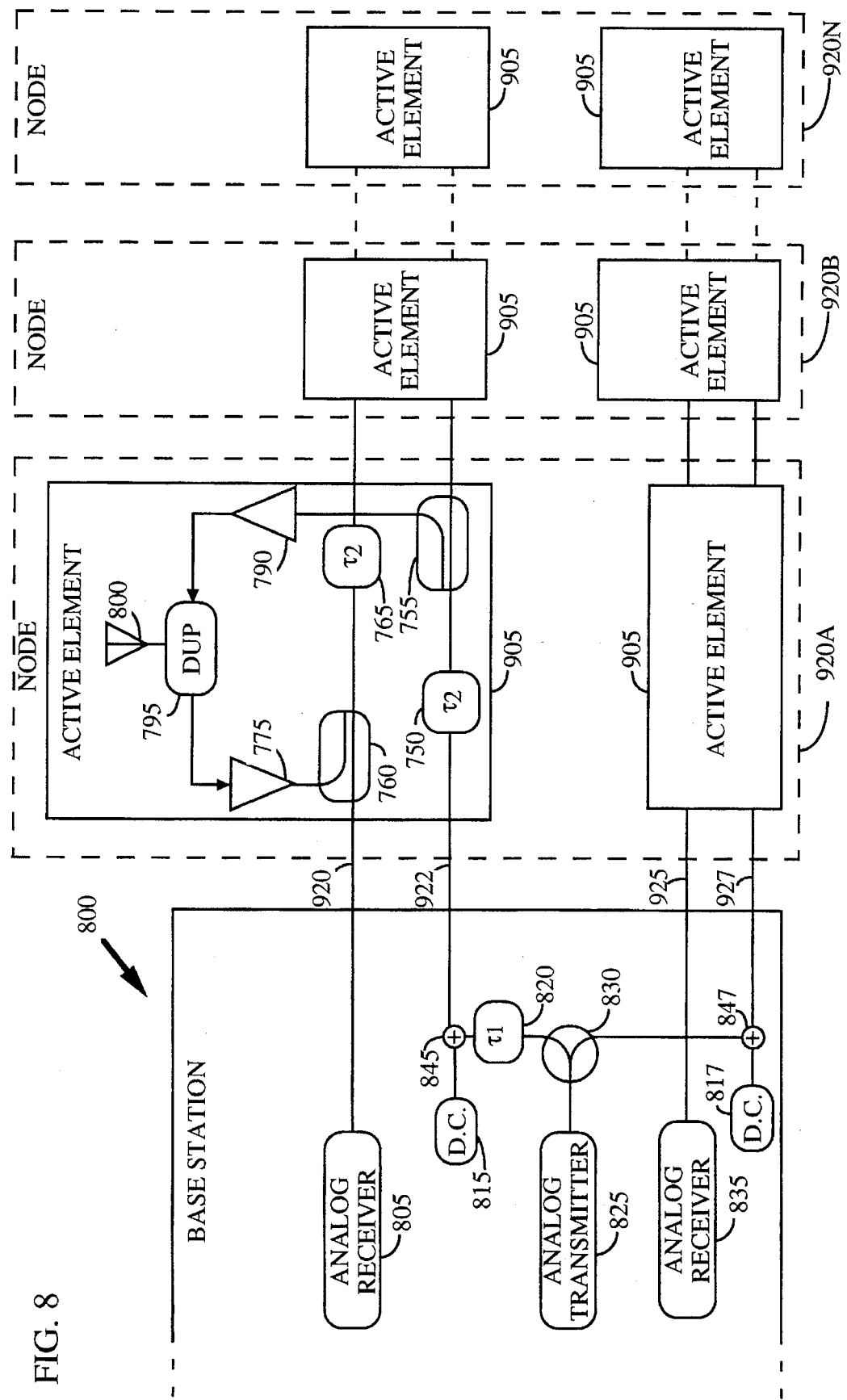
FIG. 8 is an alternative block diagram of a dual element distributed antenna system using an active element structure.

The active element can also be implemented without the frequency conversion circuitry. FIG. 8 illustrates an alternative embodiment of the active element distributed antenna. In FIG. 8 the active amplification elements are added in the transmit and receive paths within the antenna element.

In FIG. 8, base station 800 comprises analog receivers 805 and 835 which receive signals from the array of distributed antennas or nodes 920A–920N each comprised of active elements 905. In this particular arrangement analog receiver 805 receives signals along distribution cable 920 from a first set of active elements 905 while analog receiver 835 receives signals along distribution cable 925 from a second set of active elements 905. Analog transmitter 825 produces a signal that is split by splitter 830 into two signals for transmission by the parallel paths. Delay element 820 delays the transmit signal provided upon distribution cable 922 which is intended for a first one of the set of active elements 905 contained within nodes 920A–920N. The corresponding non-delayed transmit signal from splitter 830 is provided upon distribution cable 927 to the second one of the set of active elements 905 contained within the nodes 920A–920N.

Again active elements 905 require dc power to operate. As discussed with reference to FIG. 8, one method of supplying the signal is to add it to the signals on the distribution cables. Power supply 815 supplies dc power for the active elements as added to cable 922 by adder 845. Similarly, power supply 817 supplies dc power for the active elements as added to cable 927 by adder 847.

Each node of the distributed antenna is comprised of two active elements 905. Element 905 receives the transmit signal on cable 922 and couples it through delay element 750 which provides time diversity between neighboring nodes. A portion of the transmit signal is coupled from the main path by coupler 755. The coupled signal is amplified by amp 790 for transmission at an appropriate level. The signal is coupled to antenna 800 via duplexer 795.

Antenna 800 also receives the signal transmitted by the mobile unit and couples the signal to the receive portion of the element via duplexer 795. The received signal is amplified by low noise amplifier 775 and coupled by coupler 760 to the signals received by other element that have been delayed by delay element 765. An actual implementation of the element may also comprise filter elements to facilitate the signal processing. DC power is coupled (not shown) from cable 922 for all active functions performed within the element.

The active elements of FIG. 8 may be used in an outdoor environment incorporating a distributed antenna. For instance, in downtown areas having tall buildings spaced closely together, a single antenna base station may not sufficiently provide consistent signal levels over the desired coverage area. An array of antennas could be used to cover problem areas. In such a scenario, the nodes of the distributed antennas would be placed in close proximity to each other and natural propagation paths may not provide the necessary delay time required for separate demodulation of the multipath signals. A distributed antenna of the present invention would be the ideal solution in such a scenario. The increased distance between nodes in an outdoor environment, and the subsequent higher power requirement for transmit and increase in cable loss for receive, would necessitate the use of active elements. In particular the configuration of FIG. 8 is a realistic implementation of the system.

Figure 9:
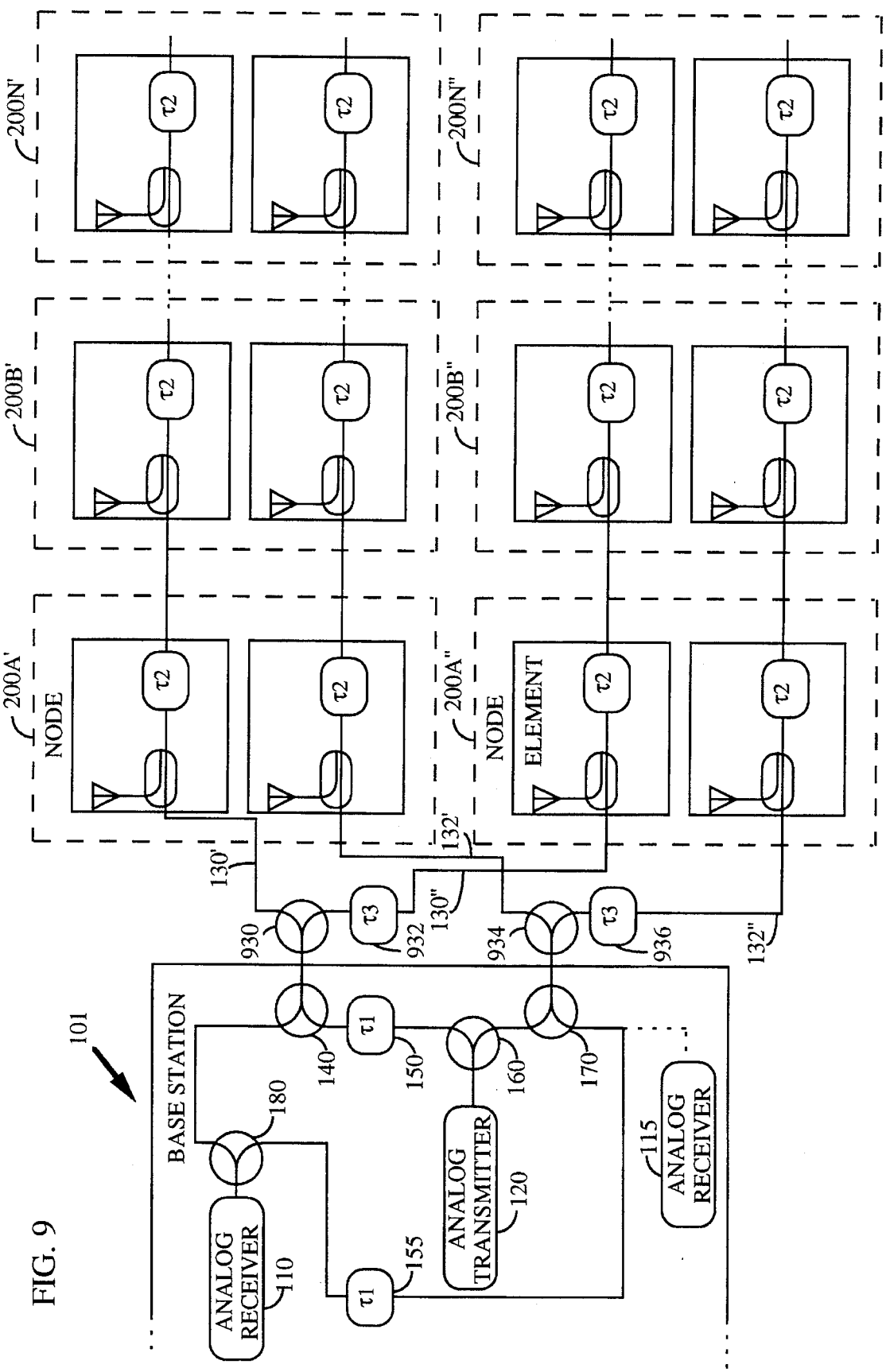
FIG. 9 is a block diagram of a basic exemplary dual element distributed antenna system comprised of three parallel arrays of antennas.

The present invention has been presented in the exemplary embodiments as nodes coupled in series to form an array. In the event of a node failure or a fault in the interconnect cabling, nodes located in the series connection beyond the failure or fault, with respect to the base station could be rendered useless in the antenna system. In order to overcome this potential drawback nodes may be coupled in parallel or series/parallel combination to provide continued coverage in the event of a node failure or interconnect cabling fault. A series/parallel combination of nodes is illustrated in FIG. 9 which represents a modified embodiment of the exemplary embodiment of FIG. 2. New elements 930, 932, 934, and 936, which do not correspond to elements in FIG. 2, are shown external to base station 101. However these elements could function equivalently if incorporated within the base station. New elements 930 and 934 are splitters which couple the two antenna arrays to base station 101. The first antenna array comprised of nodes 200A'–200N' receives and supplies signals on distribution cables 130' and 132'. The second parallel antenna array comprised of nodes 200A"–200N" receives and supplies signals on distribution cable 130" and 132" though added delay elements 932 and 936 respectively. The delay value of delay elements 932 and 936 is ideally chosen such that each antenna in the system exhibits a different delay with respect to the base station.

The topology presented in FIG. 9 can take on a variety of alternative forms. The nodes and elements of FIG. 9 could be replaced with the nodes and elements of FIG. 3, 5, 7, or 8. Splitters 930 and 934 could couple more than two arrays to the base station. In fact in a model parallel topology, each node of the system could be independently connected to the base station. The base station topology also could take on a variety of alternative embodiments. Base station 101 could be altered to contain analog receiver 115 making this topology similar to that of FIG. 5.

Figure 10:
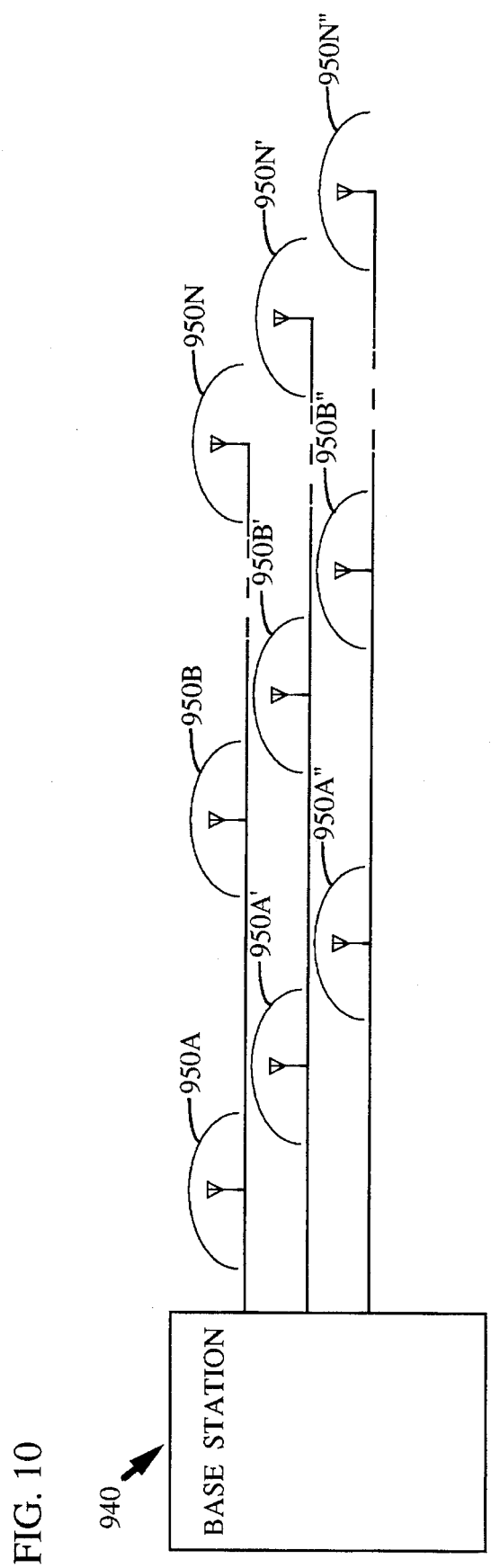
FIG. 10 is a block diagram of an exemplary placement of a dual element distributed antenna system comprising a plurality of parallel arrays.

The placement of antennas in a system comprising a series/parallel combination of nodes could take on a variety of forms. One placement topology is illustrated in FIG. 10. FIG. 10 comprises a base station and three parallel sets of series arrays. The topology of base station 940 is arbitrary in this example and could be a simple variation of any base station described herein. Each antenna node, 950A–950N, 950A'–950N', and 950A"–950N", is a dual antenna node in accordance with the present invention. Antenna nodes 950A–950N comprise the first array. Antenna nodes 950A'–950N' comprise the second array. Antenna nodes 950A"–950N" comprise the third array. Ideally every antenna node of FIG. 10 has a different delay with respect to the base station. The placement of the antenna nodes in FIG. 10 is illustrative of a distribution of antennas which would provide a good deal of protection against a fault. Instead of placing the second array after the first array and the third array after the second, the nodes of each array are interspersed with nodes of the other arrays. In this configuration, a fault in one array does not necessarily cause a complete lack of service at any point in the coverage area of the base station. Instead of creating a location where no service is provided, a fault condition produces a soft failure of the entire system that may lower the performance of the entire system.

For high capacity areas, a parallel or series/parallel combination of nodes has additional advantages over the simple series connection of an entire array. A CDMA link is limited as to a maximum number of separate signals that it can efficiently combine in a given communication channel. If more than the maximum number of signals are present, the system capacity is exceeded and overall system quality is degraded. Once the signals have been summed together, as in the case of a single series of nodes, there is no way to separate the signals such that they can be sent to multiple receivers and individually demodulated. The base station circuitry needs to limit the number of signals that are transmitted to the mobile units within the range of its antennas. Each signal transmitted by the base station increases the noise level at every mobile unit which is not the intended destination of the signal. By using a parallel or series/parallel combination of nodes and a plurality of receivers and transmitters, the signal handling capability of a single base station can be increased.

To realize an increase in system capacity at a single base station, a system is designed in which there are at least two independent arrays. In this case, an independent array is defined as any set of nodes where each node has a different delay with respect to the base station and where each node in the system can belong to only one array. In this scheme there is no disadvantage to having two nodes with the same delay with respect to the base station as long as the two nodes belong to different independent arrays. The independent arrays are placed such that there is some area which is covered by only one independent array. Each independent array is supplied a transmit signal from a dedicated transmitter and supplies a receive signal to a dedicated receiver. When a mobile unit is positioned in the coverage area of only one of the independent arrays, the transmitter corresponding to the arrays to which the mobile is not communicating may stop transmitting signals for that mobile station and thus reduce the interference to the other mobile units. Likewise, when a mobile unit is positioned in the coverage area of only one of the independent arrays, the receivers corresponding to arrays to which the mobile is not communicating are free from interference from that mobile unit. When a mobile unit is positioned in the coverage area of two independent arrays, the two transmitters supply the same information signal to the mobile unit but each transmitter uses a different spreading sequence to modulate the information signal thereby increasing the total signal received at the mobile unit while decreasing the chance of destructive summation. Likewise when a mobile unit is positioned in the coverage area of two independent arrays, the two receivers can individually receive the signal and can then combine the energy from each path in the demodulation process to provide a total increased signal level. (This process is very similar to the process which is employed by base stations comprised of multiple sectors in a standard CDMA cellular system.) Note that the topology of FIG. 9 comprising analog receiver 115 does not function to increase the capacity of the base station 101 since receiver 115 receives an input from each node of the two parallel arrays shown.

Figure 11:
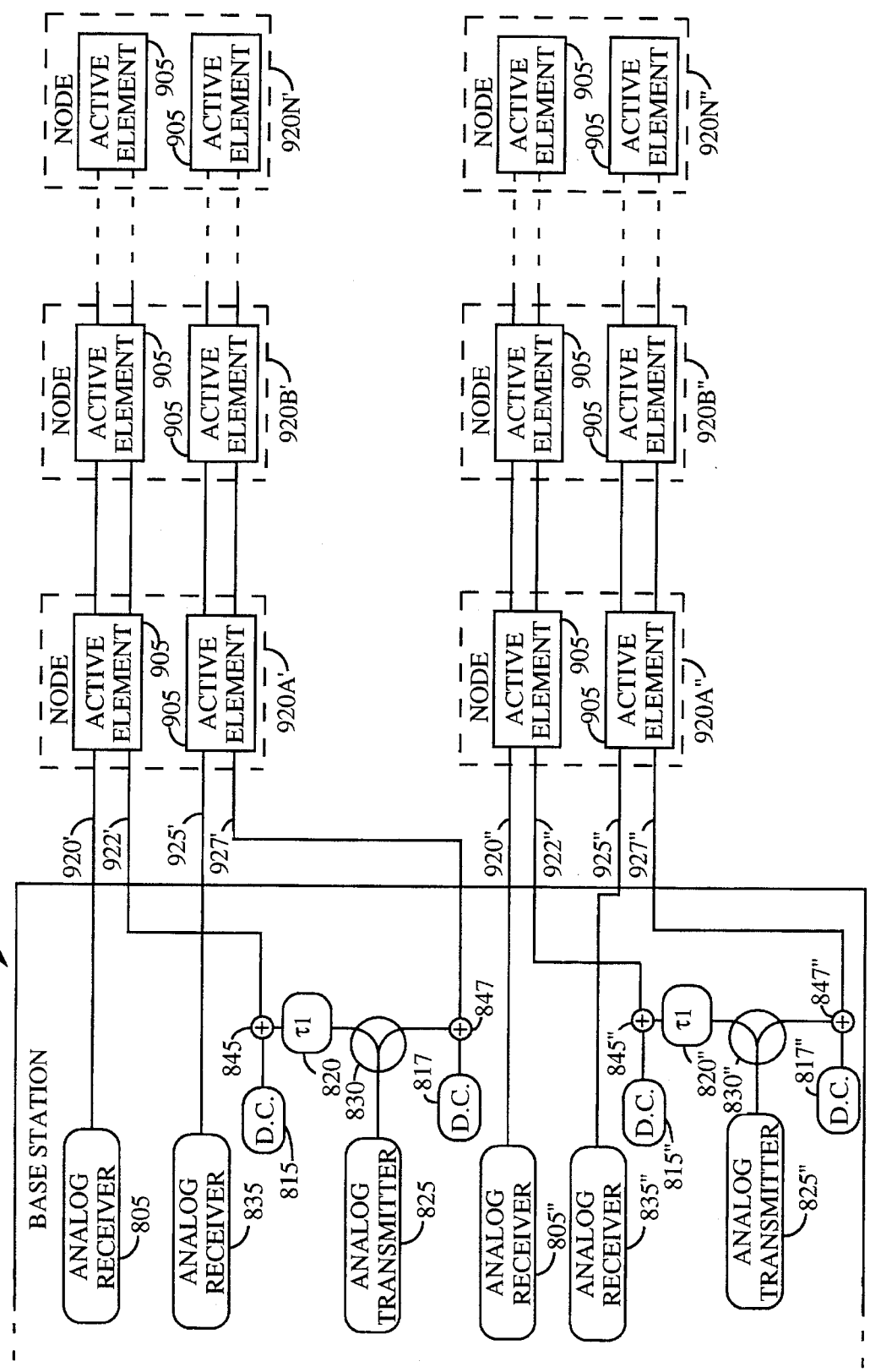
FIG. 11 is a block diagram of a dual element distributed antenna system comprising a two parallel arrays of antennas and comprising a base station having multiple independent receivers.

An exemplary embodiment of this concept is shown in FIG. 11 which is based upon the configuration of FIG. 8. The first antenna array comprised of nodes 920A'–920N' is coupled to analog transmitter 825 through cable 927', adder 847, and splitter 830. The first antenna array is also coupled to transmitter 825 through cable 922', adder 845, delay 820, and splitter 830. The second antenna array comprised of nodes 920A"–920N" is coupled to analog transmitter 825" through cable 927", adder 847", and splitter 830". The second antenna array is also coupled to analog transmitter 835 through cable 922", adder 845", delay 820", and splitter 830".

Use of the dual sets of parallel antennas affords advantages to the system during general operation as well as reducing the worst case effects of multipath fading. The coherent combining of the separate paths within the base station increases the signal-to-noise ratio on the mobile unit-to-base station link. The use of the present invention also decreases power control fluctuations of the mobile unit. Both of these factors lead to higher capacity and improved system performance. The advantages of the collocated antennas are much greater than the advantages gained by merely uniformly placing twice as many antennas in series.

There are many obvious variations of the embodiments of FIGS. 2, 3, 5, 7, 8, 9, 10, and 11 including the simple rearrangement of components within each element. Actual implementation of these embodiments may require power splitting, gain, and filtering among other functions. The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. In a digital communication signal distribution system coupled to a base station, an antenna system comprised of a series of nodes each node comprising:

a first directional coupler having two pass through ports and a coupling port, a first one of said pass through ports coupled to a first external bi-directional port of said node;

a first antenna coupled to said coupling port of said directional coupler;

a second directional coupler having two pass through ports and a coupling port, a first one of said pass through ports coupled to a second one of said pass through ports of said first directional coupler;

a first delay device having two ports, a first one of said two ports coupled to said coupling port of said second directional coupler;

a second antenna coupled to a second one of said two ports of said first delay device; and a second delay device having two ports, a first one of said two ports coupled to a second one of said two pass through ports of said second directional coupler and a second one of said two ports providing a second external bi-directional port of said node.

2. The antenna system of claim 1 wherein said first delay and said second delay provide different amount of delay to a signal which passes therethrough.

3. The antenna system of claim 1 wherein at least one digital communication signal distributed by said antenna system is a spread spectrum modulated information signal spread according to a predetermined pseudorandom noise (PN) spreading code comprised of a predetermined sequence of binary chips, each chip having a predetermined chip duration, and wherein said first delay device provides a delay on an order of at least one chip duration.

4. The antenna system of claim 3 wherein said second delay device provides a delay on an order of several chip durations.

5. The antenna system of claim 1 wherein said first antennas defines a first coverage area and said second antenna defines a second coverage area, wherein said second coverage area is substantial equivalent to said first coverage area.

6. An antenna system node for coupling digitally modulated communication signal between a base and at least one remote unit, said antennas system node comprising:

a first and second active element, each of which comprises:

an antenna having a bi-directional signal port;

a duplexer having a combined port coupled to said bi-directional port of said antenna and having a receive signal port and a transmit signal port;

a first mixer having an intermediate frequency (IF) input port, a radio frequency (RF) output port, and a local oscillator (LO) port, said RF output port coupled to said transmit signal port of said duplexer;

a first directional coupler having two through ports and a coupled port, said coupled port coupled to said IF input port of said first mixer, a first of said two through ports providing a first external connection of said active element;

a first delay device having two ports, a first port coupled to a second of said two through ports of said first directional coupler and a second port providing a second external connection of said active element;

a second mixer having an intermediate frequency (IF) output, a radio frequency (RF) input port, and a local oscillator (LO) port, said RF input port coupled to said receive signal port of said duplexer;

a second directional coupler having two through ports and a coupled port, said coupled port coupled to said IF output port of said second mixer, a first of said two through ports providing a third external connection of said active element;

a second delay device having two ports, a first port coupled to a second port of said two through ports of said second directional coupler and a second port providing a fourth external connection of said active element;

wherein said first and second active elements are positioned at said antenna system node to provide coverage to a single coverage area segment;

wherein a plurality of said antenna system nodes are coupled in series from said base and are positioned with slightly overlapping single coverage area segments to provide coverage to an extended coverage area.

7. The antenna system node of claim 6 wherein said first and second active element further comprise:

a first LO generator having a reference input port and a LO output port, said LO output port coupled to said LO port of said first mixer; and a second LO generator having a reference input port and a LO output port, said LO output port coupled to said LO port of said second mixer.

8. The antenna system node of claim 7 wherein said reference input port is coupled to one of said through ports of said first directional coupler.

9. The antenna system node of claim 7 wherein said reference input port is coupled to one of said through ports of said second directional coupler.

10. The antenna system node of claim 7 wherein said reference input port is coupled to one of said through ports of said second directional coupler through said second delay device.

11. The antenna system node of claim 7 wherein said reference input port is coupled to one of said through ports of said first directional coupler through said first delay device.

12. The antenna system node of claim 7 wherein said reference input port is coupled to one of said through ports of said first directional coupler through a low pass filter.

13. The antenna system node of claim 6 wherein at least one digital communication signal distributed by said antenna system node is a spread spectrum modulated information signal spread according to a predetermined pseudorandom noise (PN) spreading code comprised of a predetermined sequence of binary chips, each chip having a predetermined chip duration, and wherein said first and said second delay device provide a delay on an order of at least one chip duration.

14. An antenna system node for coupling digitally modulated communication signal between a base and at least one remote unit, said antennas system node comprising:

a first and second active element, each of which comprises:

an antenna having a bi-directional signal port;

a duplexer having a combined port coupled to said bi-directional port of said antenna and having a receive signal port and a transmit signal port;

a first amplifier having an input port and an output port, said output port coupled to said transmit signal port of said duplexer;

a first directional coupler having two through ports and a coupled port, said coupled port coupled to said input port of said first amplifier, a first of said two through ports providing a first external connection of said active element;

a first delay device having two ports, a first port coupled to a second of said two through ports of said first directional coupler and a second port providing a second external connection of said active element;

a second amplifier having an output port and an input port, said input port coupled to said receive signal port of said duplexer;

a second directional coupler having two through ports and a coupled port, said coupled port coupled to said output port of said second amplifier, a first of said two through ports providing a third external connection of said active element;

a second delay device having two ports, a first port coupled to a second of said two through ports of said second directional coupler and a second port providing a fourth external connection of said active element;

wherein said first and second active elements are positioned at said antenna system node to provide coverage to a single coverage area segment;

wherein a plurality of said antenna system nodes are coupled in series from said base and positioned with slightly overlapping single coverage area segments to provide coverage to an extended coverage area.

15. The antenna system node of claim 13 wherein at least one digital communication signal distributed by said antenna system node is a spread spectrum modulated information signal spread according to a predetermined pseudorandom noise (PN) spreading code comprised of a predetermined sequence of binary chips, each chip having a predetermined chip duration, and wherein said first and said second delay device provide a delay on an order of at least one chip duration.

16. A CDMA communication using system spreading codes, said system having a plurality of mobile units and a base station, said mobile units and base station provided with respective receiving sections each of which has a diversity receiver for reducing the effects of multipath fading, said base station comprising:

a series of collocated antenna, a first collocated antenna being spaced from a second collocated antenna by 10 to 20 wavelengths so as to produce a space diversity effect; and a plurality of delay means coupled with said series of collocated antennas, for applying time delays to signals which pass through said series of collocated antennas, said time delay being different from each other by at least one symbol period of the spreading codes.

* * * * *